(No Model.)
T. B. FOGARTY.
PROCESS OF MANUFACTURING GAS.
No. 261,698. Patented July 25, 1882.
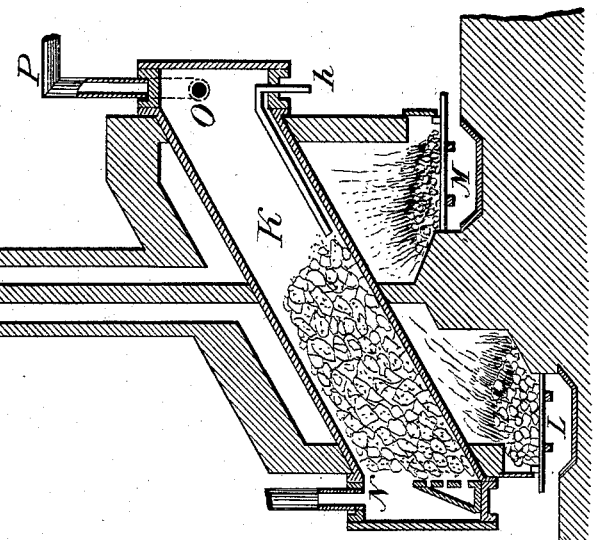
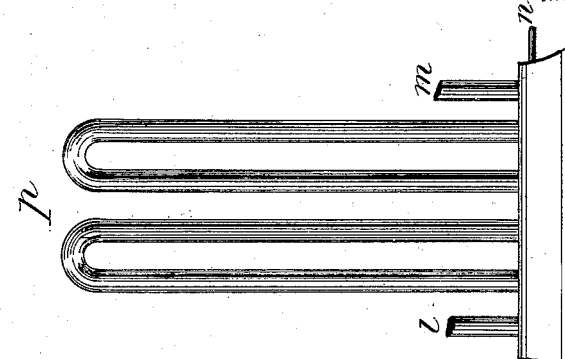
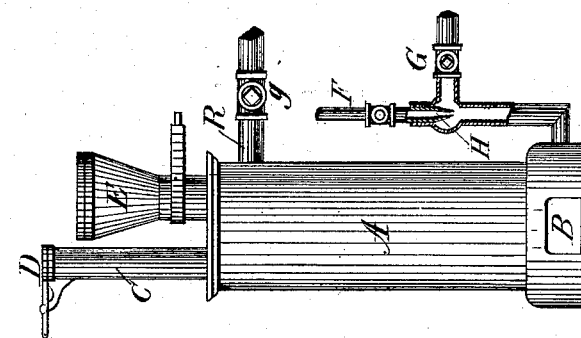
Witnesses:
John F. Randolph
Leo Rosenberg
Inventor:
Wm. B. Fogarty

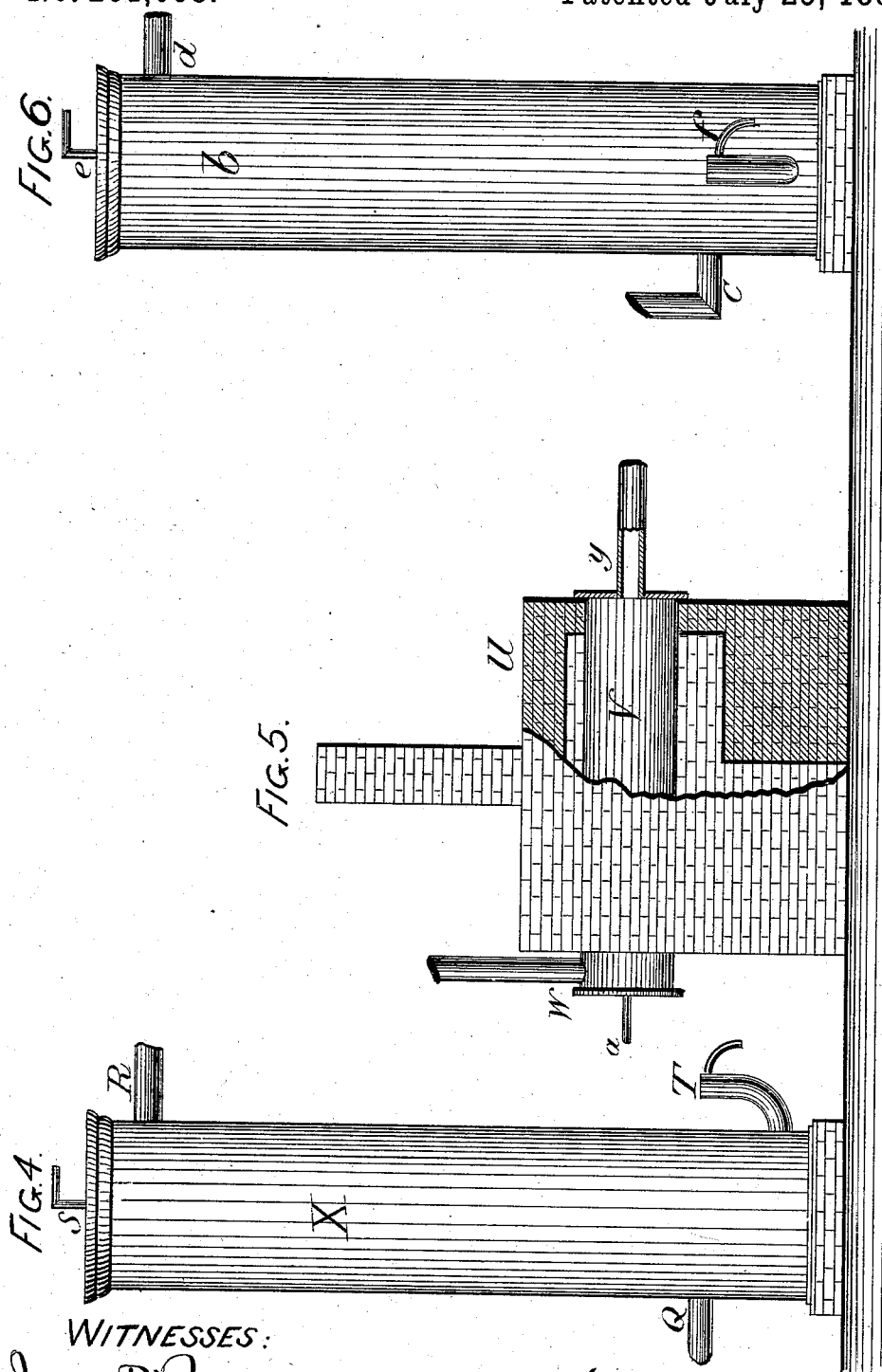

UNITED STATES PATENT OFFICE.

THOMAS B. FOGARTY, OF BROOKLYN, NEW YORK.

PROCESS OF MANUFACTURING GAS.

SPECIFICATION forming part of Letters Patent No. 261,698, dated July 25, 1882.

Application filed January 24, 1882. (No model.)

*To all whom it may concern:*

Be it known that I, THOMAS B. FOGARTY, of the city of Brooklyn, county of Kings, and State of New York, have invented a certain new and useful Improvement in the Process of Manufacturing Gas for Heating and Illuminating Purposes; and I hereby declare the following to be a full, clear, and exact description of the same, reference being had to the accompanying drawings, forming part of this specification.

My invention relates to the manufacture of heating and illuminating gas through the decomposition of steam by incandescent carbon, and its object is to produce a cheap and pure heating and illuminating gas, and simultaneously therewith valuable residuals.

It is well known that nearly all of the gas obtained through the decomposition of steam by incandescent carbon—commonly known as "water gas," by which name I shall speak of it in this specification—as heretofore manufactured is largely contaminated by carbonic oxide—a compound of such a poisonous character that the sale of gas containing it, except within prescribed quantities, is in many places prohibited by state or municipal legislation—while at the same time much of it contains so large a quantity of nitrogen that its value as a heating or illuminating agent is thereby seriously diminished.

The object of my invention is to produce a cheap water-gas which, within desired limits, will be practically free from impurities, and at the same time to cheapen its production by producing simultaneously with it valuable residuals, the sale of which will nearly, if not altogether, pay the entire cost of manufacturing and distributing the gas.

I shall now proceed to describe my invention so fully and clearly that any person skilled in the art of making water-gas may be able to understand and practice the same, and for this purpose I shall divide or classify it into and under five different parts or heads, as follows: First, the manufacture of a very cheap but exceedingly impure heating-gas, the chief impurities of which will consist of nitrogen, carbonic oxide, carbonic acid, and some sulphurous compounds; second, the separation of the undecomposed steam from the gas, and, third, the partial purification of the gas by the conversion of its nitrogen, either wholly or partly, into ammonia or ammoniacal salts and the separation of these ammoniacal products from the gas; fourth, the further purification of the gas by the conversion, either wholly or partly, of its carbonic oxide into carbonic acid, with the liberation of a volume of hydrogen equal to that of the carbonic oxide removed; fifth, the further and practically complete purification of the gas by the removal of its carbonic acid and sulphureted hydrogen, such purification being chiefly effected by means of the ammonia produced from the nitrogen of the gas itself in the second part of my process.

Be it here understood that when I speak of "purification" I do not mean that I shall render the gas absolutely free from the impurity or impurities to which I may refer, but merely that I shall render it practically and reasonably free from such impurity within desired limits. Be it also understood that when I speak of removing any impurity or other matter from the gas I refer to its removal to a practical and reasonable degree within reasonable limits.

I shall now proceed to describe in detail the several parts of my invention, their connections with each other and with other parts of my invention not heretofore specified, and the manner of their combination to form a perfect and continuous process.

In carrying out the first part of my invention I admit steam into a close cupola, furnace, or retort of any suitable form or construction, filled, or partly filled, with incandescent carbon—such as coal, coke, charcoal, or peat—and heated by an external fire or by internal combustion, or by a combination of both, and in conjunction with such steam, and by means of any suitable pump, jet, aspirator, or exhauster, I suck or draw or force into and through the said cupola furnace or retort a suitable volume of atmospheric air. When the cupola furnace or retort is heated externally, either wholly or partly, the volume of air admitted may be regulated according to the percentage of nitrogen which it is desirable that the gas should contain at this time; but when it is heated by internal combustion, as will usually be found the preferable course, the volume of air admitted must bear such a proportion to the volume of steam and the requirements of the combustion taking place within the cupola that the oxygen contained in such air shall be capable of supporting the combustion sufficiently to overcome the cooling effect of the decomposition of the steam, in which case the temperature of the cupola or furnace will be even and uniform, proper provisions of course being made for feeding and cleaning the fire. The steam and air upon one side and the fuel upon the other will now combine with each other to form a highly-combustible gas, which will vary in composition according to the temperature of the furnace or cupola, the relative proportions of the steam and air, and the greater or less thickness of the stratum of incandescent carbon through which it has passed, but under suitable conditions of temperature having an average composition about as follows: carbonic acid, ten per cent.; cabonic oxide, seventeen per cent.; hydrogen, thirteen per cent.; nitrogen, sixty per cent. It is evident that by keeping the proportions of air and steam perfectly adjusted to each other the furnace or cupola may be kept at a uniform temperature and the production of gas may be made continuous.

It will be readily seen that while part of the gas so produced may be made the basis of an excellent illuminating-gas, another portion may be advantageously used as fuel to heat the retorts and other apparatus to be hereinafter described.

I do not claim this process of producing an inflammable gas broadly as my invention, for it is old and well known, having been patented in England by Constable, and again by Pollard in 1845; but I do claim it as a part of my process when used in combination with the other parts thereof and as a part of the said process.

The second part of my invention refers to the separation of the undecomposed steam from the gas.

It is well known that in making a "generator-gas" by injecting steam and air through incandescent carbon contained in a cupola, as described in that part of this specification relating to the first part of my invention, a very large percentage of the steam escapes decomposition, and, as it is desirable that my generator-gas should be as free from watery vapor as possible, I now proceed to condense the undecomposed steam, or by some other means remove it from the gas, so that the latter may be as free from watery vapor as possible, and thus better fitted for the production of ammonia, as will be seen presently in that part of this specification which relates to the third part of my invention.

The third part of my invention refers to the removal of the nitrogen, either wholly or partly, from the gas by its conversion, either wholly or partly, into ammonia or some of the salts thereof.

For the purpose of removing the nitrogen, I now cause the gas to pass through a retort or chamber or series of such containing coal, coke, charcoal, or any other suitable form of carbon, either solid or gaseous, in a highly-incandescent state and mixed in suitable proportions with an alkali of some sort, such as soda, potash, lime, or barium, or any suitable mixture, compound, or combination of the same; but preferably I use the carbonate of an alkali which parts readily with its acid. Now, under the influence of the intense temperature the carbon, nitrogen, and alkali will combine to form cyanide and cyanate of the alkali used, and these, being brought into contact with steam at a suitable temperature, are decomposed by it and give rise to ammonia or ammoniacal compounds formed by the combination of the nitrogen of the cyanides and cyanates with the hydrogen of the steam, the liberated carbon uniting with the oxygen of the steam to form additional volumes of carbonic oxide and carbonic acid, and the alkali returning to its original state or entering into fresh combinations.

It is well known that ammoniacal gas and many of its compounds are decomposed by a red heat, while other compounds of this gas—notably muriate of ammonia—are merely volatilized at the same temperature, and this circumstance would present an insuperable obstacle to the employment of some alkaline compounds—notably the alkaline carbonates—for the purposes of my invention were it not that the cyanides and cyanates of the alkalies are decomposed by steam at a temperature much less than that which is required to produce them. From this it follows that in order to prevent the destruction of ammonia, or such of its compounds as are decomposed by a red heat, it is only necessary to see that as far as possible the temperature at which they are formed is below a decomposing-heat. As it is evident that ammonia cannot be formed except in the presence of watery vapor, it is frequently necessary to arrange the decomposing-retort so as to be heated by a separate fire at each end or in some other way so that each end of the retort may be kept at a suitable temperature. The steam being then admitted only to the cooler end of the retort, the resulting ammoniacal products will be formed only at this end, and consequently will be in no danger of being destroyed by excessive temperature. For the same reason it is often advisable to effect the decomposition of the cyanogen compounds and the subsequent conversion of their nitrogen into ammonia in a retort or chamber, or series of such, separate from that in which they have been formed, and kept at a lower temperature. It may also be often expedient to effect or cause the formation of the ammoniacal compounds in the same furnace, cupola, or retort in which the generator-gas is produced, as described in that part of this specification which relates to the first part of my invention. In this case it will be necessary to apply external heat to the generator-furnace and to lengthen or extend it or otherwise provide a suitable chamber in which the cyanogen compounds formed within the furnace may be reduced to a temperature suitable for the production and preservation of the ammoniacal products. In this case the alkali may be introduced directly into the generator, which may be done by mixing it with the coal in a mass or in alternate layers, or by spraying or injecting it, as may be most convenient. When the alkali used is chloride of sodium it is not necessary to reduce the temperature of the cyanogen compounds, as the product of their decomposition will in this case be chloride of ammonia, which, instead of being decomposed, is merely volatilized at elevated temperatures. In any case care must be taken that the cyanogen compounds will be formed at the temperature best suited to their economical production, and that the subsequent ammoniacal products also will be formed at the temperature best adapted to their preservation. My reason for removing the undecomposed watery vapor from the generator-gas, as described in that part of this specification which relates to the second part of my invention, before its introduction to the ammonia-retort will now be evident, for if I did not do so the presence of the watery vapor in the gas would cause the decomposition of the cyanogen compounds and the production of ammonia in the heated end of the retort, where it would be immediately resolved into its elements by the elevated temperature of this part of the retort, while, on the contrary, by freeing the gas as far as practicable from watery vapor before its introduction to the ammonia-retort I am enabled to retard the decomposition of the cyanogen compounds and their conversion into ammonia until conditions favorable to the production and preservation of this gas have been attained. The gas, now consisting principally of hydrogen, ammonia in different forms, carbonic oxide, carbonic acid, and such nitrogen as may have escaped decomposition and conversion, is next passed through a suitably-constructed condenser or scrubber, or other cooling apparatus, so as to reduce its temperature sufficiently to admit of the combination of ammonia and carbonic acid, which always takes place when these gases are brought together at a low temperature. The resulting carbonate of ammonia is very soluble in water, and may be absorbed and separated by it in passing through the scrubber or condenser, or, if desired, in a separate apparatus. A little reflection will now show why I prefer to use the alkali in the form of a carbonate. By doing so the resulting ammonia will be obtained for the most part in a free or uncombined state, and will consequently be in the best possible form for use as an effective means of removing the enormous quantities of carbonic acid, which would otherwise have to be removed from the gas by lime—an expensive and laborious operation.

I do not claim broadly as my invention the process of converting nitrogen into ammonia by means of an alkali, for this is old and well known, there being several well-known patented processes for this purpose; but I do claim as new and as my invention the application of any alkali process for the conversion of free nitrogen into ammonia to the removal, either wholly or partly, of the free nitrogen from a heating or regenerator gas, such as described in that part of this specification which relates to the first part of my invention, when used in combination with a process for removing the watery vapor from the generator-gas before its introduction to the ammonia-retort, as already described; nor do I claim broadly as new the process of placing lime or other alkali in a retort with the coal or other carbon during the process of distilling it for the production of gas, for this is old and well known, having been frequently used and patented both in this country and England; but I do claim the combination of a condenser and an ammonia-producing retort or apparatus with a gas-generator when used for the purpose of eliminating free nitrogen from the gas and converting it into ammonia, substantially as described.

I do not confine or limit myself to the specific details, as it is evident that they may be greatly modified.

I shall now proceed to describe in detail the fourth part of my invention, which relates to the further purification of the gas by the conversion, either wholly or partly, of its carbonic oxide into carbonic acid, with the liberation of a volume of hydrogen equal to that of the carbonic oxide removed.

The gaseous products being freed from ammonia, and consisting of hydrogen, carbonic oxide, carbonic acid, and such nitrogen as may have escaped conversion, are now caused to pass through one or more highly-heated retorts, in which they are brought into intimate contact with steam, when, the entire mixture being brought to an intense heat, the steam is decomposed by the carbon of the carbonic oxide, giving rise to a volume of carbonic acid equal to that of the decomposed oxide, and at the same time setting an equal volume of hydrogen free.

I do not claim this process of removing the carbonic oxide from the gas broadly as my invention, for it is old and well known, having been used most successfully for many years at the city of Narbonne, in France; but I do claim it in combination with the desiccating and ammonia processes described in those parts of this specification which relate to the second and third parts of my invention.

The fifth part of my invention relates to purifying the gas from carbonic acid and sulphureted hydrogen.

For the purpose of purifying my gas from carbonic acid and sulphureted hydrogen, I avail myself of the great quantity of ammonia resulting from the decomposition of the nitrogen, as described in that part of this specification which relates to the third part of my invention; and by means of scrubbers or other suitable devices, and under suitable conditions of moisture and temperature, I bring it (the ammonia) into intimate contact with the carbonic acid and sulphureted hydrogen of the gas and cause it to combine therewith and to form commercial salts, which may be readily separated and collected.

I do not claim broadly as new or as my invention the process of purifying gas from carbonic acid and sulphureted hydrogen by means of ammonia, for this is old and well known; but I do claim it as new when used in combination with the second and third parts of my invention, already described.

My gas, having been thus purified, now consists chiefly of pure hydrogen; but it may still retain some sulphurous impurities incapable of being removed by ammonia, and which may require to be submitted to other purifying agencies before the gas becomes thoroughly fitted for domestic use. For the removal of these impurities the ordinary iron or lime purification will be usually sufficient, and at the same time will be found inexpensive on account of the extremely small amount of these impurities which can be present.

By the above-described process I am enabled to produce a nearly pure hydrogen gas at a very slight cost, and, in addition, will have in the enormous quantity of ammoniacal salts produced valuable residuals, the sale of which will, under favorable circumstances, more than repay the cost not only of producing, but also of carbureting and distributing, the gas.

In the drawings, Figure 1 is an elevation of a gas-generating furnace or cupola of any suitable construction. Fig. 2 is an elevation of a condenser of any suitable construction. Fig. 3 is a section of an ammonia-producing furnace and retort. Fig. 4 is an elevation of a scrubber of any suitable construction. Fig. 5 is a view, partly in section and partly in elevation, of a furnace and retort. Fig. 6 is an elevation of a scrubber of any suitable construction.

Fig. 1 shows a cupola or furnace, A, of any suitable construction, in which B is the ash-pit door; C, the chimney, provided with a suitable cap or valve, D; E, a hopper for feeding the furnace; F, a steam and G an air pipe, and H a steam jet or injector connected with a suitable boiler. (Not shown in the drawings.) Fig. 2 shows a condenser of any suitable construction, having its inlet $l$, its outlet $m$, and its overflow $n$. Fig. 3 represents a retort, K, set in a suitable furnace. This retort is shown as being partly filled, and as being heated by two fires, L and M. Its inlet N is in practice to be connected to the condenser, Fig. 2, at the outlet $m$ and its outlet O to be also connected to the scrubber X, Fig. 4, at its inlet Q. Fig. 4 shows a scrubber, X, of any suitable construction, provided with an inlet-pipe, Q, an outlet, R, a water-pipe, S, and an overflow, T. Fig. 5 shows a furnace, U, of any suitable construction, containing a retort, V, with its inlet W, having a suitable outlet, Y, and being provided with a suitably-connected steam-pipe, $a$, suitably connected to a boiler. (Not shown in the drawings.) Fig. 6 shows a scrubber, $b$, provided with its inlet $c$, outlet $d$, water-pipe $e$, and overflow $f$.

The mode of operation is as follows: I first open the door B and chimney-valve D of the furnace or cupola A, Fig. 1, and having filled the furnace to a suitable depth with coal, coke, charcoal, or any other suitable form of carbon, I ignite the fuel and allow it to burn until it becomes incandescent—at least to a considerable degree. I now close the valve D, and having opened the cock of the steam-pipe F, which is supplied with steam from a suitable boiler, (not shown in the drawings,) and also the cock on the air-pipe G, which is open to the atmosphere, the steam escapes through the jet H, carrying with it or inducing a current of air drawn through the open air-pipe G and forcing it into the ash-pit beneath the furnace. As soon as the mingled stream of air and steam strikes the incandescent fuel in the cupola the steam becomes decomposed with a slight explosion and flame issues from the furnace-door B. The cock $g$ on the pipe R is now opened and the door B is tightly closed, whereupon the mingled stream of air and steam is forced upward through the mass of incandescent fuel in the cupola, from which they escape as a generator-gas, the hydrogen and nitrogen of the steam and air passing on unchanged, while their oxygen combines with the carbon of the coal or other fuel to form carbonic oxide and carbonic acid in proportions which vary according to the relative volumes of the steam and air, the temperature of the furnace, and the greater or less depth of the mass of incandescent fuel. The production of gas will now be uniform and continuous, if proper care be taken to replenish and clean the fire at proper intervals. Its quality, too, will be pretty constant and uniform if the relative volumes of air and steam are adjusted to and supplied in proper proportions.

Although the above form of cupola and order of procedure may be followed to advantage, I do not bind or limit myself to them, as it is evident that they may be varied indefinitely, and that with proper arrangements nearly as good a result can be reached by a simple air-blast alternated with a simple current of steam.

As the generator-gas escapes from the furnace I cause it to pass through a suitable condenser, $p$, Fig. 2, by means of which the undecomposed steam in the gas is separated from it; or I cause it to pass through one or more chambers containing chloride of calcium or some other absorbent, by means of which the gas may, as far as practicable, be deprived of its moisture and so become better fitted for the next operation. From the condenser the gas, having been practically deprived of the watery vapor present in it, enters the retort K, Fig. 3, by the inlet N. This retort is shown in the drawings as being heated by a separate fire at each end, so as to afford means for keeping each end at the temperature best suited to the work which it has to do. The retort is filled at one end, as shown in the drawings, with coal, coke, charcoal, or some other suitable form of carbon suitably mixed with an alkali compound or combination of an alkali, and at the other end, or at any other suitable or convenient point, is furnished with the pipe $h$, supplied with steam from any suitable source. Care is taken that the end of the retort which contains the mixed carbon and alkali is kept at a high temperature and the other end comparatively cool, so that the highly-heated gases escaping from the incandescent mass of carbon and alkali may be reduced to a suitable temperature by the comparatively low heat of the cooler end of the retort, as well as by the cooling effect of a volume of steam which is admitted to it through the pipe $h$. As the gas passes through the incandescent mass of carbon and alkali its nitrogen unites with them to form cyanide and cyanate of the alkali, and these escaping from the incandescent mass, and being brought into suitable contact with steam at a suitable temperature in the cooler end of the retort, mutual decomposition and transposition of elements ensue, the nitrogen combining with the hydrogen of the steam to form ammonia and the carbon going to the oxygen to form carbonic oxide and carbonic acid, while the alkali returns to its original condition or unites with the carbonic acid to form a carbonate.

I do not confine or restrict myself to the particular state, form, or combination in which the carbon and alkali are introduced into the retort, for it is well known that under favorable and suitable conditions the carbon of the carbonic oxide contained in the gas may be made available for this purpose; and, indeed, it is more than probable that this carbon, under any circumstances, takes its part in the chemical reactions and mutual decompositions which take place within the retort. Nor do I confine or restrict myself to the particular form or arrangement of the retort and furnace, or of either of them, as it is evident that this may be varied indefinitely—their forms and relative arrangement and connection, the manner of using them, and the order and nature of the chemical changes and reactions which take place within them varying according to the nature and form of the alkali used, as well as of these of the products desired.

From the retort K the gas, practically free from nitrogen, now passes through the outlet O to the scrubber X, Fig. 4, through which it passes slowly, and in which it is continually broken up and brought into contact with the cool wet surfaces of coke, brush, slats, or other substances capable of obstructing and breaking it up, with which the scrubber is filled, and over which water or other liquid is caused to trickle slowly. The consequence of this scrubbing process is that the gas attains a low temperature, and the ammonia, taking up one or more equivalents of carbonic acid, is converted into a carbonate, which is immediately dissolved by the liquid passing through the scrubbers, and is carried off by it through the overflow T. The gas, which is now reasonably free from nitrogen, escaping from the scrubber, enters the retort V, Fig. 5, at W, where it meets with a current of steam supplied from a suitable boiler through the pipe $a$, and preferably superheated, and immediately decomposes it, the oxygen of the steam combining with the carbonic oxide of the gas and converting it into carbonic acid, while its hydrogen is set free and goes to swell the volume of the combustible gases. The volumes of carbonic acid and hydrogen resulting from the decomposition of the steam by the carbonic oxide will be in all cases each equal to the entire volume of carbonic oxide removed from the gas. The gas yet requires to be freed from the enormous volume of carbonic acid which it now contains, and this I effect by causing it to pass from the retort V, Fig. 5, into the scrubber $b$, Fig. 6, which it enters at $c$, and in which it meets with a volume of ammonia which has meanwhile been regenerated or recovered, and which has been caused to enter the scrubber through a suitable connection. (Not shown in the drawings.) The gas now passes slowly upward through the scrubber in company with the ammonia, and both gases being thoroughly mixed and broken up by the obstructions which they meet with, and being, moreover, subjected to cooling influences and to the contact of wet surfaces and liquid absorbents, the ammonia again takes up one or more equivalents of carbonic acid, the resulting carbonates being dissolved in the liquid and passing off through the overflow of the scrubber. As the volume of carbonic acid in the gas as it leaves the retort V is usually much more than is required to convert all the ammonia into a bicarbonate, it is usually necessary to regenerate or recover the ammonia more than once before it can be made available for the complete purification of the gas from carbonic acid. The gas may yet require to be freed from sulphurous impurities incapable of being removed by ammonia; but this having been effected by subjecting it to the ordinary iron or lime purification, it will now be in a proper condition for use as a heating agent for either domestic or manufacturing purposes. However, it still requires to be suitably carbureted or enriched with hydrocarbon gases or vapors before it becomes capable of being used for the ordinary purposes of illumination. As, however, there are various well-known processes for this purpose, and as, moreover, they have no connection with my invention, except incidentally, it is unnecessary to do more than allude to them here.

I do not bind or confine myself to the process or succession of processes or to the forms of apparatus described, for it is very evident that in a continuous and extended process like my invention the several processes and details and the exact order and succession of the same, as well as the forms, construction, and arrangement of the apparatus used, may be varied indefinitely. I do not claim any one of the several parts or processes which go to make up my improved process separately and of itself broadly as new and as my invention, for they are all old and well known and have been in use heretofore in independent processes in the arts; but I do claim their combination as a whole, so as to constitute a new process, as well as the several combinations into which they enter with each other, and the parts which they play as members of the general process, as follows.

What I claim, and desire to secure by Letters Patent, is—

1. The process herein described of manufacturing gas, which consists in injecting or forcing air and steam into or through incandescent carbon in a suitable producer; then passing the gas produced thereby through a condenser to remove undecomposed steam; then passing the gas through carbon and alkali raised to a high temperature; then injecting steam into the same; then passing the gas into a highly-heated retort and again injecting steam, and then purifying the gas by washing it with ammoniacal liquor, substantially as described.

2. In the production of gas by the decomposition of steam, the process of removing nitrogen from the same, which consists in separating or removing the undecomposed steam from the crude gas, then causing such gas to pass through carbon and alkali raised to a high temperature, and then injecting steam into the gas at a lower temperature, substantially as described.

In testimony whereof I have signed my name to this specification before two subscribing witnesses.

THOS. B. FOGARTY.

Witnesses:
  EDWIN F. CURRY,
  FRANK. S. HOAG.